(12) United States Patent
Sweeney et al.

(10) Patent No.: US 11,729,166 B2
(45) Date of Patent: Aug. 15, 2023

(54) AUTHENTICATION OF PASSIVE DEVICES

(71) Applicant: Arista Networks, Inc., Santa Clara, CA (US)

(72) Inventors: Adam Sweeney, San Jose, CA (US); Jifei Song, Palo Alto, CA (US); Avinash Ratnavel Maharaj Ratnavel, San Jose, CA (US); Jaffar Hameed Abdul Kather Jilani, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 420 days.

(21) Appl. No.: 16/922,956

(22) Filed: Jul. 7, 2020

(65) Prior Publication Data
US 2022/0014519 A1    Jan. 13, 2022

(51) Int. Cl.
*H04L 29/06*        (2006.01)
*H04L 9/40*         (2022.01)
*H04L 61/103*       (2022.01)
*H04L 12/46*        (2006.01)
*H04L 101/622*      (2022.01)

(52) U.S. Cl.
CPC ...... *H04L 63/0876* (2013.01); *H04L 12/4679* (2013.01); *H04L 61/103* (2013.01); *H04L 2101/622* (2022.05)

(58) Field of Classification Search
CPC . H04L 63/02; H04L 63/0227; H04L 63/0236; H04L 63/0272; H04L 63/0892; H04L 63/10; H04L 63/1408; H04L 63/0876; H04L 12/4679; H04L 61/103; H04L 2101/622; H04W 12/06
See application file for complete search history.

(56) References Cited

U.S. PATENT DOCUMENTS

| 7,370,346 B2 * | 5/2008 | Congdon | H04L 63/08 |
| | | | 726/4 |
| 7,796,614 B1 * | 9/2010 | Weymans | H04L 45/02 |
| | | | 370/395.54 |

(Continued)

OTHER PUBLICATIONS

Varis et al. Minimizing ARP Broadcasting in Trill, Dec. 4, 2009, IEEE, pp. 1-6. (Year: 2009).*

(Continued)

*Primary Examiner* — Luu T Pham
*Assistant Examiner* — Jenise E Jackson
(74) *Attorney, Agent, or Firm* — Fountainhead Law Group P.C.

(57) ABSTRACT

Some embodiments provide a method, executable by a network device, that receives a first set of commands instructing the network device to allow network traffic to egress out of an authentication port of the network device. The authentication port is configured to belong to a first virtual local area network (VLAN). An unauthenticated device is connected to the authentication port. The method further receives a second set of commands instructing the network device to add ports belonging to the first VLAN to a broadcast domain of a second VLAN. The method also broadcasts an address request to the broadcast domain of the second VLAN. The method further receives, from the unauthenticated device, a response to the address request.

16 Claims, 7 Drawing Sheets

(56) References Cited

U.S. PATENT DOCUMENTS

| | | | |
|---|---|---|---|
| 9,407,643 B1* | 8/2016 | Bavington | H04L 63/1408 |
| 2002/0052972 A1* | 5/2002 | Yim | H04L 61/10 |
| | | | 370/254 |
| 2002/0080800 A1* | 6/2002 | Lee | H04L 12/4641 |
| | | | 370/395.54 |
| 2009/0059799 A1* | 3/2009 | Friskney | H04L 41/0681 |
| | | | 370/241.1 |
| 2010/0074261 A1* | 3/2010 | Muhamed | H04L 12/4662 |
| | | | 370/395.3 |
| 2011/0004918 A1* | 1/2011 | Chow | H04L 63/08 |
| | | | 726/3 |
| 2012/0047293 A1* | 2/2012 | Otani | G06F 3/067 |
| | | | 710/313 |
| 2015/0281067 A1* | 10/2015 | Wu | H04L 45/56 |
| | | | 370/392 |
| 2015/0373688 A1* | 12/2015 | Samuel Raj | H04L 63/108 |
| | | | 370/329 |
| 2016/0330143 A1* | 11/2016 | Song | H04L 45/42 |
| 2020/0314003 A1* | 10/2020 | Nandy | H04L 45/245 |
| 2021/0226817 A1* | 7/2021 | Oswal | H04L 61/5014 |
| 2022/0021557 A1* | 1/2022 | Yu | H04L 12/4633 |

OTHER PUBLICATIONS

Elmeleegy et al, EtherProxy: Scaling Ethernet By Supressing Broadcast Traffic, Apr. 25, 2009, pp. 1584-1592. (Year: 2009).*

* cited by examiner

AUTHENTICATION OF PASSIVE DEVICES

BACKGROUND

Network devices use a variety of techniques to determine whether to allow network hosts access to networks. One such technique is media access control (MAC)-based authentication. With MAC-based authentication, when a network host tries to connect to the network, a network device may send an authentication server a MAC address associated with the network host and a request to authenticate the MAC address. The authentication server can send a response to the network device indicating whether the MAC address is authenticated or not. If the MAC address is authenticated, the network device allows the network host access to the network. Otherwise, the network device does not allow the network host access to the network.

The following detailed description and accompanying drawings provide a better understanding of the nature and advantages of various embodiments of the present disclosure.

DETAILED DESCRIPTION

Figure 1:
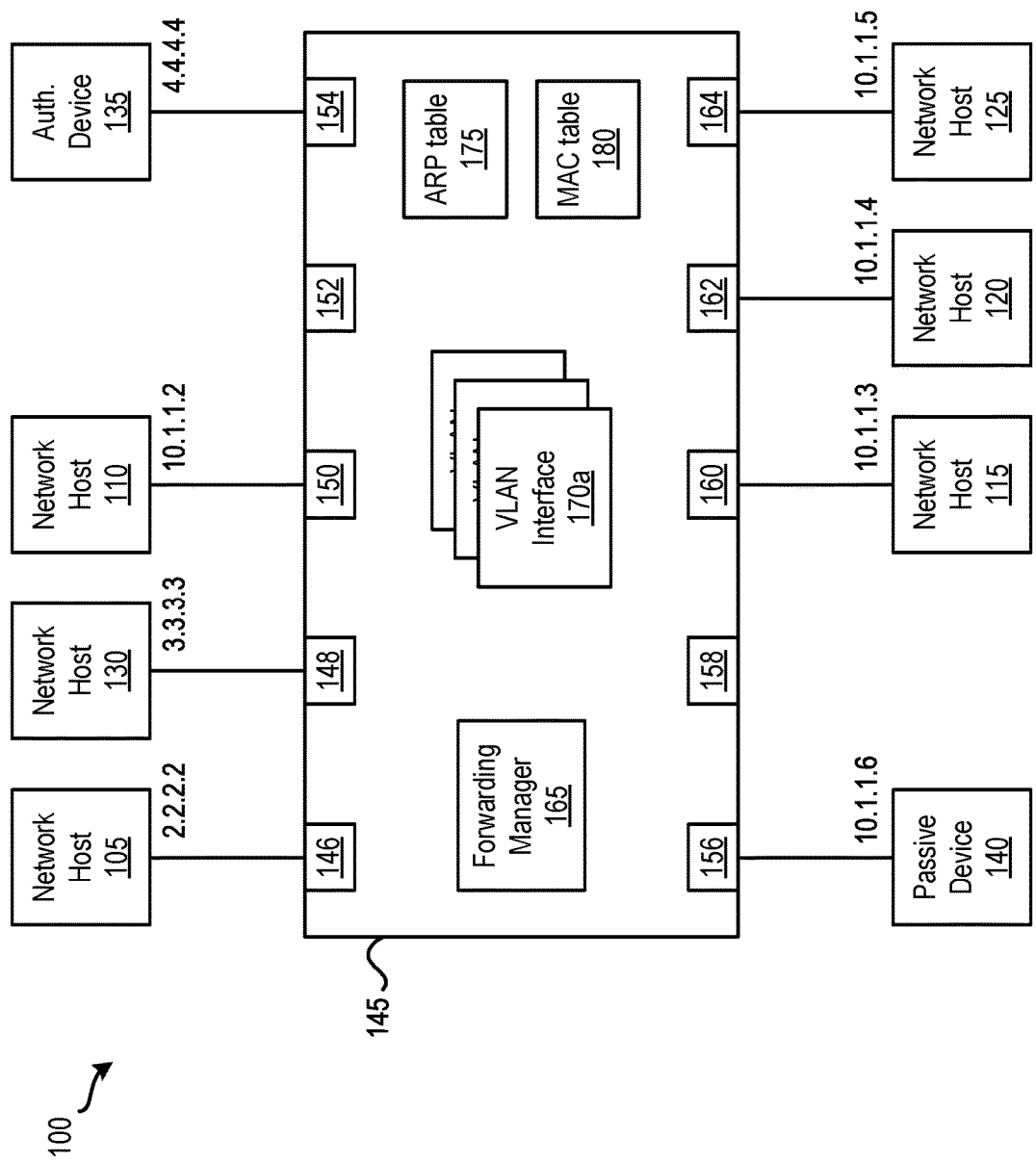
FIG. 1 illustrates a network according to some embodiments.

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for authenticating passive devices. In some embodiments, a system includes a network device and a passive device connected to a port of the network device. In addition, the passive device is not authorized to access networks. As such, network hosts cannot access the passive device. The port on the network device may be blocked. That is, the port does not allow ingress traffic or egress traffic. In some embodiments, when the network device does not allow ingress or egress traffic, the network device may still receive network traffic, but the network device just does not forward the network traffic. In addition, the port is configured to belong to a first virtual local area network (VLAN). However, the passive device is configured with an Internet Protocol (IP) address that belongs to a subnet associated with a second VLAN. To authenticate the passive device, the network device is configured with two sets of commands. The first set of commands allows network traffic to egress out of the port to which the passive device is connected. The second set of commands adds ports belonging to the first VLAN to a broadcast domain of the second VLAN. To elicit a response from the passive device, a network host sends the network device a request with the IP address of the passive device as the destination IP address. Because the IP address of the passive device belongs to the subnet associated with the second VLAN, the network device determines that the request is to be sent to the second VLAN. The network device does not recognize the IP address. Therefore, the network device broadcasts an address resolution protocol (ARP) request specifying the IP address of the passive device to the ports belonging to the second VLAN. The ports belonging to the first VLAN are included in the broadcast domain of the second VLAN so the ARP request is able to reach the passive device. The passive device responds to the ARP request by sending the network device an ARP response specifying the media access control (MAC) address of the passive device. When the network device receives the ARP response, the network device sends an authentication device the MAC address as well as a request to authenticate the MAC address. A list of authorized MAC addresses managed by the authentication device has an entry that authorizes the use of the MAC address of the passive device in the second VLAN. Hence, the authentication device sends the network device a response indicating that the MAC address is authorized to be used in the second VLAN. Upon receiving the response, the network device allows the passive device to be accessible. Now when a network host sends the network device traffic destined for the passive device, the network device is able to forward the traffic to the passive device.

1. Example Network

FIG. 1 illustrates a network 100 according to some embodiments. As shown, network 100 includes network hosts 105, 110, 115, 120, 125, 130, authentication device 135, passive device 140, and network device 145. Each of the network hosts 105, 110, 115, 120, 125, 130 is a device configured to send data (e.g., packets) to and receive data from other network hosts (e.g., any of the other network hosts 105-130, authentication device 135, passive device 140, etc.). Network hosts 105, 110, 115, 120, 125, 130 each is configured with an IP address. For this example, as illustrated in FIG. 1, network host 105 is configured with an IP address of 2.2.2.2, network host 110 is configured with an IP address of 10.1.1.2, network host 115 is configured with an IP address of 10.1.1.3, network host 120 is configured with an IP address of 10.1.1.4, network host 125 is configured with an IP address of 10.1.1.5, and network host 130 is configured with an IP address of 3.3.3.3.

Authentication device 135 is responsible for authenticating network hosts (e.g., network hosts 105, 110, 115, 120, 125, 130 and passive device 140) in network 100. That is, authentication device 135 may determine whether a particular network host is allowed to access network 100. For example, authentication device 135 can receive from network device 145 an authentication request, which specifies a MAC address, to determine whether the MAC address is allowed to access network 100. Authentication device 135 is configured with a list of authorized MAC addresses. An entry in the list may include a MAC address as well as a VLAN identifier (ID) of a VLAN that the MAC address is allowed to access. When authentication device 135 receives the MAC address and the request from network device 145, authentication device 135 checks the list to determine whether an entry in the list includes a MAC address that matches the MAC address. If such an entry exists in the list, authentication device 135 sends network device 145 a response indicating that the MAC address is authorized to access the VLAN in network 100 associated with the VLAN ID. If an entry does not exist in the list, authentication device 135 sends network device 145 a response indicating that the MAC address is not authorized to access network 100. In some embodiments, authentication device 135 may be a computing device (e.g., an authorization server). In this example, authentication device 135 is configured with an IP address of 4.4.4.4.

Passive device 140 is a network host connected to network device 145 that can communicate with other network hosts (e.g., network hosts 105, 110, 115, 120, 125, 130). However, passive device 140 is unable to actively transmit traffic. That is, passive device 140 does not initiate communication with another network host. Passive device 140 is configured to only respond to requests from other network hosts. Examples of such devices include a sensor, a thermal controller, a power controller, a smartphone, etc. In some embodiments, passive device 140 is configured to not respond to an Institute of Electrical and Electronics Engineers (IEEE) standard 802.1X request. For this example, passive device 140 is configured with an IP address of 10.1.1.6.

As shown in FIG. 1, network device 145 includes ports 146, 148, 150, 152, 154, 156, 158, 160, 162, 164, forwarding manager 165, VLAN interfaces 170*a-n*, ARP table 175, and MAC table 180. ARP table 175 is configured to store entries of mappings between layer 3 interfaces (e.g., VLAN interfaces, routed ports, etc.), IP addresses, and MAC addresses. MAC table 180 stores mappings between MAC addresses, ports 146, 148, 150, 152, 154, 156, 158, 160, 162, 164, and VLAN IDs.

Ports 146, 148, 150, 152, 154, 156, 158, 160, 162, 164 are network interfaces configured to receive data (e.g., packets) from, and transmit data to, network hosts. In this example, network host 105 is connected to port 146, network host 130 is connected to port 148, network host 110 is connected to port 150, authentication device 135 is connected to port 154, passive device 140 is connected to port 156, network host 115 is connected to port 160, network host 120 is connected to port 162, and network host 125 is connected to port 164. In some embodiments, one or more of the ports 146, 148, 150, 152, 154, 156, 158, 160, 162, 164 can be configured to use MAC-based authentication to authenticate a network host connected to the corresponding port. Such ports may be referred to as authentication ports. For instance, when network device 145 receives from a network host an ARP response packet, which includes a MAC address of the network host, through an authentication port, network device 145 sends authentication device 135 an authentication request, which includes the MAC address, to determine whether the MAC address is allowed to access network 100. In return, network device 145 receives a response from authentication device 135. The response can indicate either the MAC address is authorized to access a VLAN in network 100 associated with a VLAN ID or the MAC address is not authorized to access network 100. If the response indicates that the MAC address is authorized to access a VLAN in network 100 associated with a VLAN ID, network device 145 configures the authentication port to be included in the VLAN. Additionally, network device 145 adds an entry to MAC table 180 specifying a mapping between the MAC address, the authentication port, and the VLAN ID. In some embodiments, one or more of the ports 146, 148, 150, 152, 154, 156, 158, 160, 162, 164 can be configured for routing network data (e.g., layer 3 network data). Such ports are referred to as routed ports. One or more of the ports 146, 148, 150, 152, 154, 156, 158, 160, 162, 164 can be configured for bridging network data (e.g., layer 2 network data). Such ports are referred to as bridge ports.

Forwarding manager 165 handles the forwarding of network data (e.g., IP packets, Ethernet frames, etc.). For example, when forwarding manager 165 receives an IP packet, it determines how to forward the IP packet (e.g., to one of the ports 146, 148, 150, 152, 154, 156, 158, 160, 162, 164). In some cases, when forwarding manager 165 receives an IP packet via one of the ports 146, 148, 150, 152, 154, 156, 158, 160, 162, 164, forwarding manager 165 determines a VLAN that is associated with a subnet to which the IP address belongs. Then, forwarding manager 165 sends the IP packet to the VLAN interface 170 that is the interface into the VLAN. Next, forwarding manager 165 forwards the packet within the VLAN. In other cases, when network device 145 receives an IP packet from a VLAN interface 170, forwarding manager 165 determines where to forward the IP packet. For example, forwarding manager 165 may determine that the IP packet is to be forwarded to a network host via one of the ports 146, 148, 150, 152, 154, 156, 158, 160, 162, 164 and forwards the IP packet out the port.

Each of the VLAN interfaces 170*a-n* serves as an interface to a particular VLAN. For example, when a VLAN interface 170 receives a packet, forwarding manager 165 forwards the packet within the VLAN for which the VLAN interface 170 serves as an interface. For example, forwarding manager 165 can perform a lookup on MAC table 180 to determine whether MAC table 180 includes an entry with a mapping that includes the MAC address specified in the packet. If so, forwarding manager 165 forwards the packet to the port specified in the mapping.

2. Example Dataflow

Figure 2:
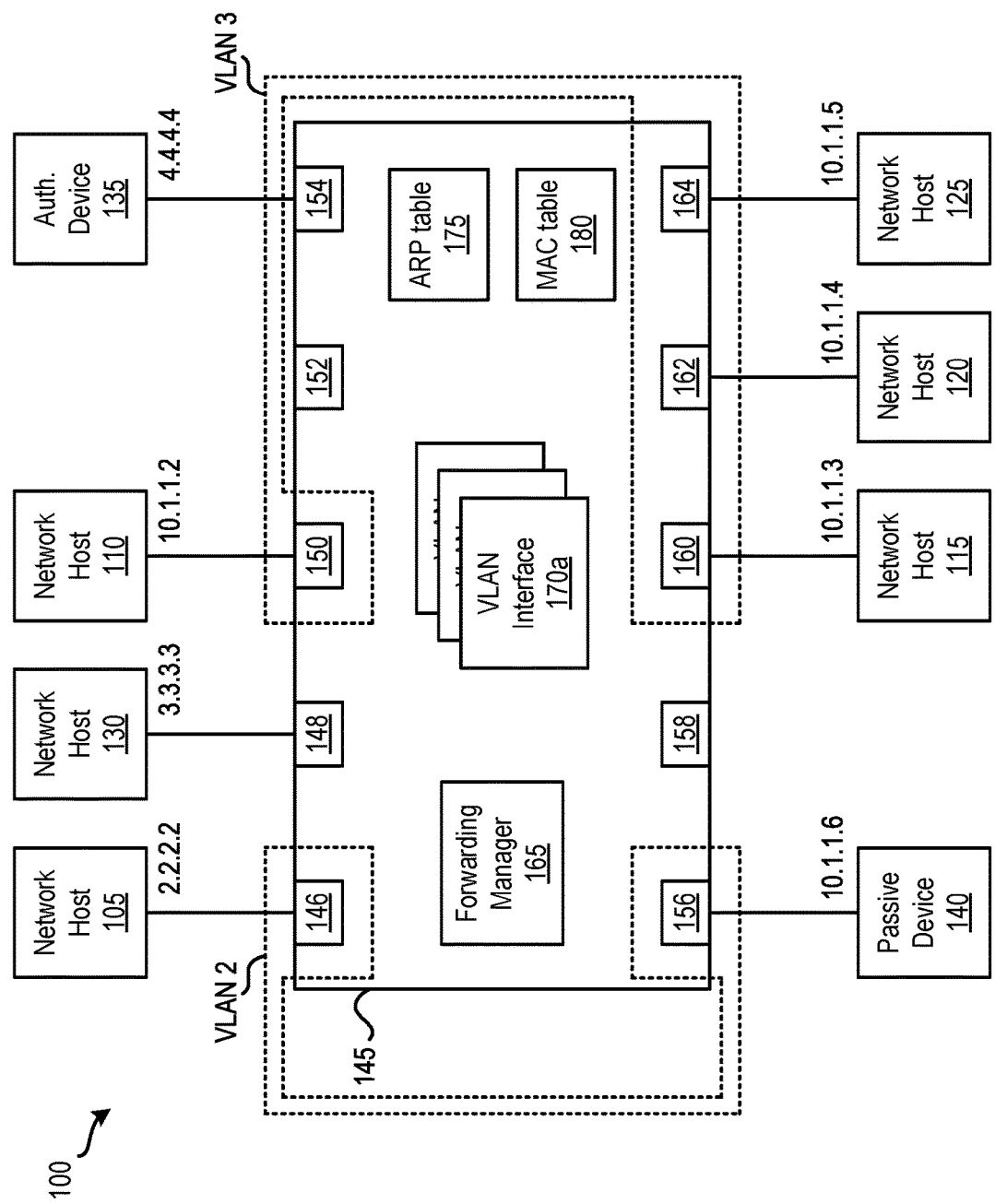
FIG. 2 illustrates virtual local area networks (VLANs) configured for the system illustrated in FIG. 1 according to some embodiments.
Figure 3:
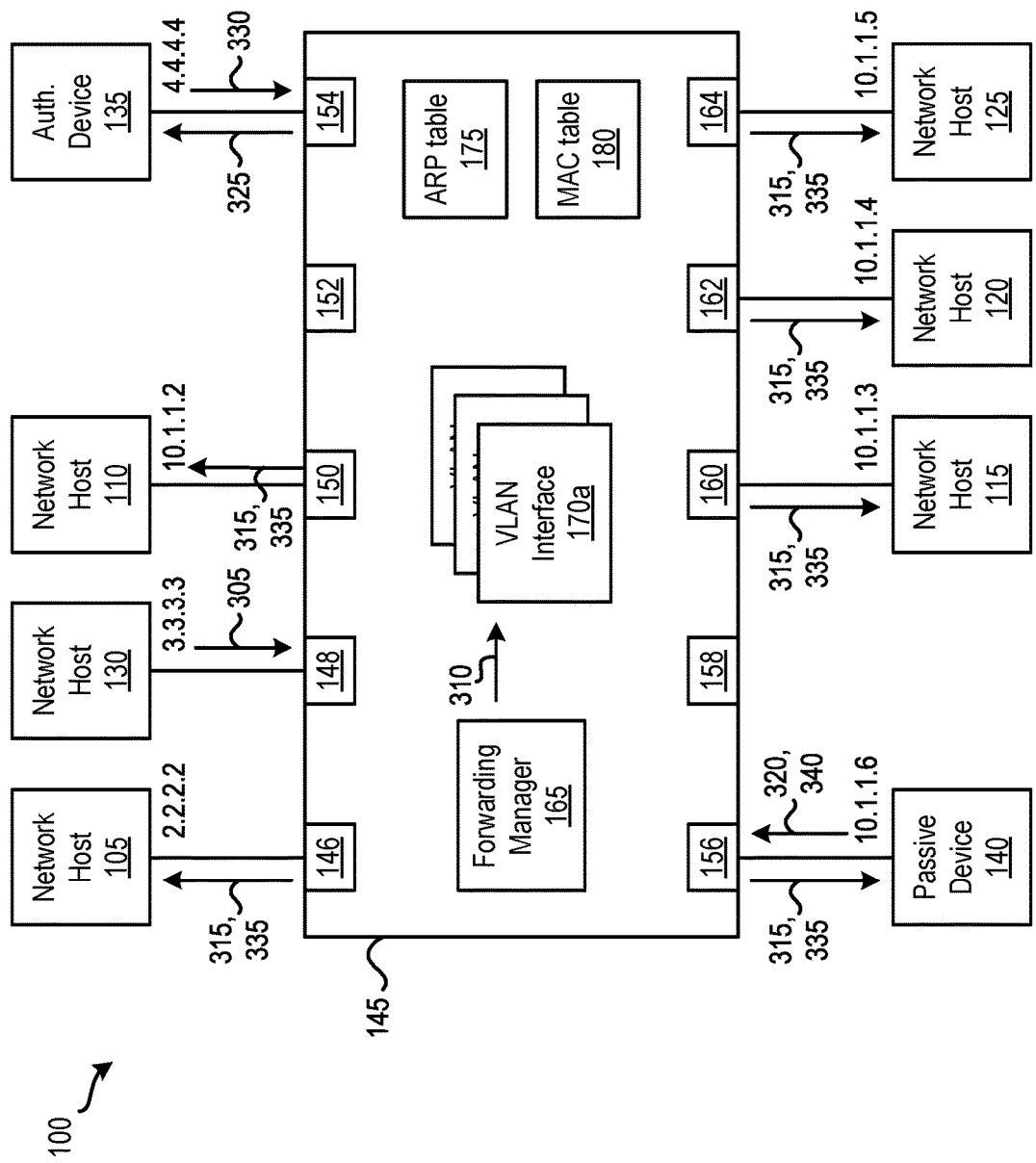
FIG. 3 illustrates an example dataflow through the system illustrated in FIG. 1 according to some embodiments.
Figure 4:
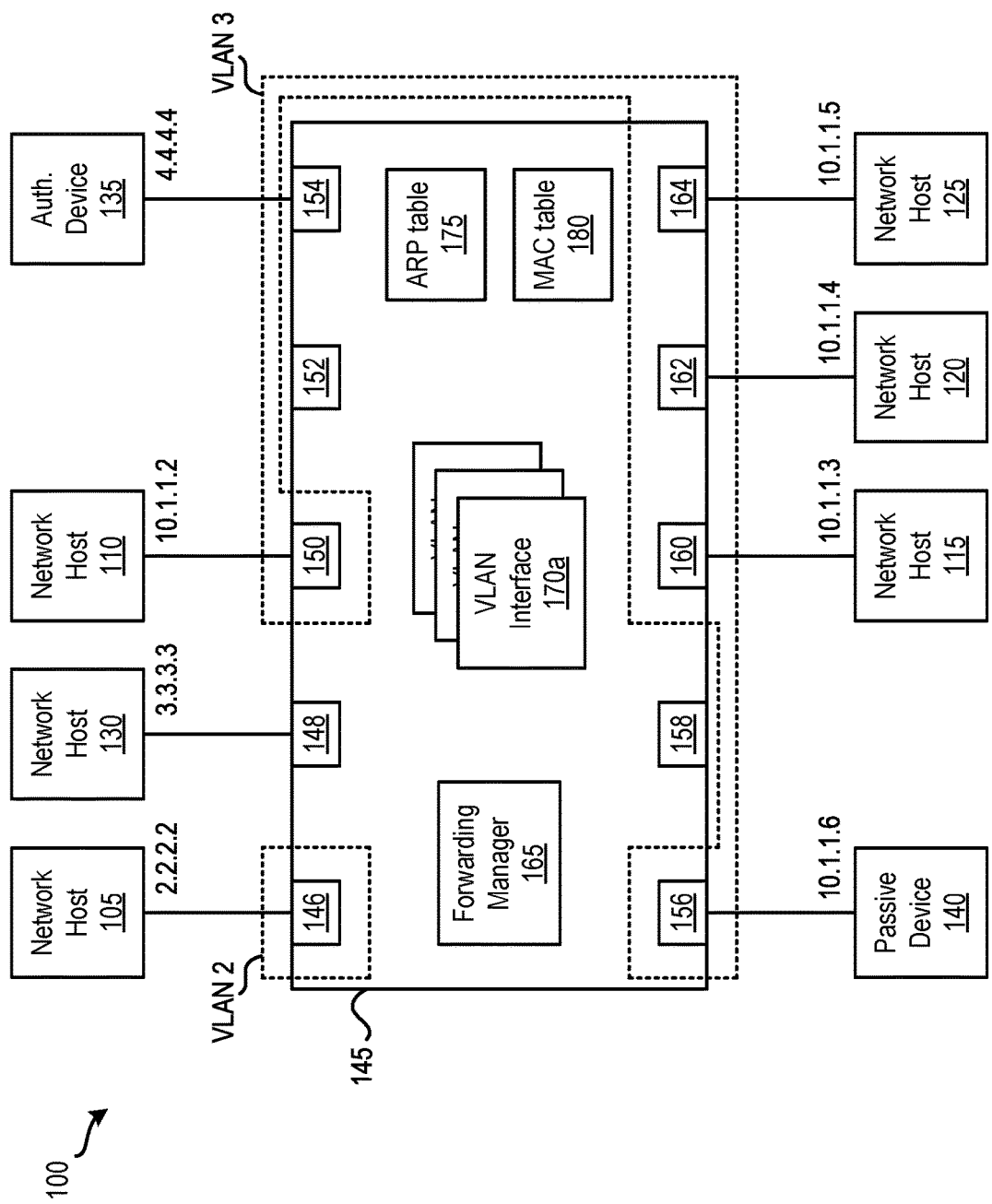
FIG. 4 illustrates the VLANs configured for the system illustrated in FIG. 2 after authentication of a passive device according to some embodiments.

This section will describe an example dataflow through network 100 by reference to FIGS. 2-4. FIG. 2 illustrates VLANs configured for system 100 according to some embodiments. Specifically, FIG. 2 illustrates two VLANS that have been configured for this example dataflow. As shown, a first VLAN with a VLAN ID of 2 is configured to include ports 146 and 156. Therefore, network host 105 and passive device 140 are networked together through the first VLAN. VLAN interface 170*a* is the interface for the first VLAN. A second VLAN with a VLAN ID of 3 is configured to include ports 150 and 160, 162, 164. As such, network hosts 110 and 115, 120, 125 are networked together through the second VLAN. The subnet of the second VLAN is 10.1.1.1/24 in this example. VLAN interface 170*b* is the interface for the second VLAN. In this example, the first VLAN and VLAN 2 will be used interchangeably and the second VLAN and VLAN 3 will also be used interchangeably. Passive device 140 is an unauthenticated device that is not allowed to access network 100. Port 156 is configured as an authentication port. For this example, network device 145 has received a set of commands (e.g., from a user of network device 145) instructing network device 145 to allow network traffic to egress out of port 156. In addition, network device 145 has also received a set of commands (e.g., from a user of network device 145) instructing network device 145 to add ports belonging to the first VLAN (i.e., ports 146 and 156) to the broadcast domain of the second VLAN.

FIG. 3 illustrates an example dataflow through system 100 according to some embodiments. The example dataflow starts by network host 130 sending, at 305, network device 145 a request destined for passive device 140. In particular, the request specifies the IP address of passive device 140 (10.1.1.6 in this example) as the destination IP address in the request. An example of such a request is a hypertext transfer protocol (HTTP) request like the following: http://10.1.1.6. Once network device 145 receives the request, forwarding manager 165 determines a VLAN that is associated with a subnet to which the IP address specified in the request belongs. Here, forwarding manager 165 determines that the IP address 10.1.1.6 belongs to the 10.1.1.1/24 subnet. Since the second VLAN is associated with the 10.1.1.1/24 subnet, forwarding manager 165 sends, at 310, the request to VLAN interface 170b, which is the VLAN interface for the second VLAN in this example.

Upon receiving the request, forwarding manager 165 performs a lookup on ARP table 175 to check whether ARP table 175 includes an entry with a mapping associated with VLAN interface 170b that includes the destination IP address specified in the request. For this example, ARP table 175 does not have an entry for the IP address of passive device 140 (i.e., 10.1.1.6) that is associated with VLAN interface 170b. As such, forwarding manager 165 generates a first ARP request specifying the IP address of 10.1.1.6 and broadcasts, at 315, the first ARP request to the broadcast domain of the second VLAN. As mentioned above, network device 145 was instructed to add ports belonging to the first VLAN to the broadcast domain of the second VLAN. Hence, when forwarding manager 165 broadcasts the first ARP request to the broadcast domain of the second VLAN, the first ARP request is broadcasted out of ports 146, 150, 156, and 160, 162, 164 to network host 105, network host 110, passive device 140, and network hosts 115, 120, 125, respectively.

When a network host receives an ARP request, the network host sends a response to the ARP request only if the network host is configured with the IP address specified in the ARP request. Therefore, in this example, only passive device 140 sends network device 145 a response to the first ARP request. Specifically, passive device 140 sends, at 320, network device 145 a first ARP response that includes the MAC address of passive device 140. Once network device 145 receives the first ARP response, network device 145 sends, at 325, an authentication request that is addressed to authentication device 135 via port 154. For this example, the first ARP response does not reach forwarding manager 165.

As explained above, authentication device 135 is configured with a list of authorized MAC addresses. For this example, the list includes an entry that specifies the MAC address of passive device 140 and a VLAN ID of 3. So when authentication device 135 receives from network device 145 the authentication request that includes the MAC address of passive device 140, authentication device 135 checks the list to determine whether an entry in the list includes a MAC address that matches the MAC address of passive device 140. As mentioned above, the list contains such an entry. Therefore, authentication device 135 sends, at 330, network device 145 a response indicating that the MAC address of passive device 140 is authorized to access VLAN 3. As such, network device 145 configures port 156 to allow ingress and egress traffic. In addition, network device 145 configures port 156 to be included in VLAN 3.

As described above, forwarding manager 165 did not receive a response to the first ARP request. Thus, after a defined amount of time of not receiving a response to the first ARP request, forwarding manager 165 generates a second ARP request specifying the IP address of 10.1.1.6 and broadcasts, at 335, the second ARP request to the broadcast domain of the second VLAN. When forwarding manager 165 broadcasts the second ARP request to the broadcast domain of the second VLAN, the second ARP request is broadcasted out of ports 146, 150, 156, and 160, 162, 164 to network host 105, network host 110, passive device 140, and network hosts 115, 120, 125, respectively. Passive device 140 is configured with the IP address specified in the second ARP request, so only passive device 140 sends network device 145 a response to the second ARP request. In particular, passive device 140 sends, at 340, network device 145 a second ARP response that includes the MAC address of passive device 140. Since port 156 has been authenticated and thus, has been configured to receive ingress and egress traffic, forwarding manager 165 receives the second ARP response. Upon receiving it, forwarding manager 165 stores a mapping between the IP address 10.1.1.6 and the MAC address received in the ARP response (i.e., the MAC address of passive device 140) in ARP table 175. FIG. 4 illustrates VLANs configured for the system illustrated in FIG. 2 after authentication of passive device 140 according to some embodiments. As shown, port 156 has been removed from VLAN 2 and now belongs to VLAN 3. Returning to FIG. 3, network device 145 also adds an entry to MAC table 180 specifying a mapping between the MAC address of passive device 140, port 156, and the VLAN ID of 3.

At this point, passive device 140 is authenticated and, thus, is allowed access to network 100. That is, passive device 140 can be accessed by other network hosts (e.g., network hosts 105, 110, 115, 120, 125, 130). For instance, network host 110 may send network device 145 a request specifying the IP address of passive device 140 (10.1.1.6 in this example) as the destination IP address. Upon receiving this request, forwarding manager 165 determines that the IP address 10.1.1.6 belongs to the 10.1.1.1/24 subnet. As such, forwarding manager 165 sends the request to VLAN interface 170b, which is the VLAN interface for the second VLAN in this example. VLAN interface 170b performs a lookup on ARP table 175 to determine whether ARP table 175 includes an entry with a mapping that includes the destination IP address specified in the request. VLAN interface 170b finds an entry with a mapping between the IP address 10.1.1.6 and the MAC address of passive device 140. Then, forwarding manager 165 performs a lookup on MAC table 180 to determine whether MAC table 180 includes an entry with a mapping that includes the MAC address of passive device 140. Here, VLAN interface 170b finds an entry specifying a mapping between the MAC address of passive device 140 and port 156. Thus, VLAN interface 170b forwards the request to port 156.

The example described above illustrates a network host sending network device 145 a request destined for passive device 140 that triggers network device 145 to generate an ARP request and broadcast it to VLAN 100. In some embodiments, the ARP request can be generated by network devices other than network device 145. For example, in some such embodiments, network device 145 may receive an ARP request from another network device connected to network device 145 via a port that is configured to belong to VLAN 100. In response to receiving the ARP request from this other network device, network device 145 broadcasts it to the ports belonging to VLAN 100 in the same manner explained above by reference to operation 315. The process continues from operation 315 in the same manner described in the example except network device 145 also forwards the second ARP response to the other network device.

FIGS. 1-4 show network hosts 105, 110, 115, 120, 125, 130 and authentication device 135 connected to network device 145. One of ordinary skill in the art will appreciate that the arrangement of network hosts 105, 110, 115, 120, 125, 130 and authentication device 135 in network 100 can be different in different embodiments. For example, any of the network hosts 105, 110, 115, 120, 125, 130 and/or authentication device 135 can be communicatively coupled (e.g., indirectly connected) to network device 145 via other network devices and/or network hosts. Also, additional and/or different network hosts can be directly or indirectly connected to ports 146, 148, 150, 152, 154, 156, 158, 160, 162, 164 of network device 145.

3. Example Process

Figure 5:
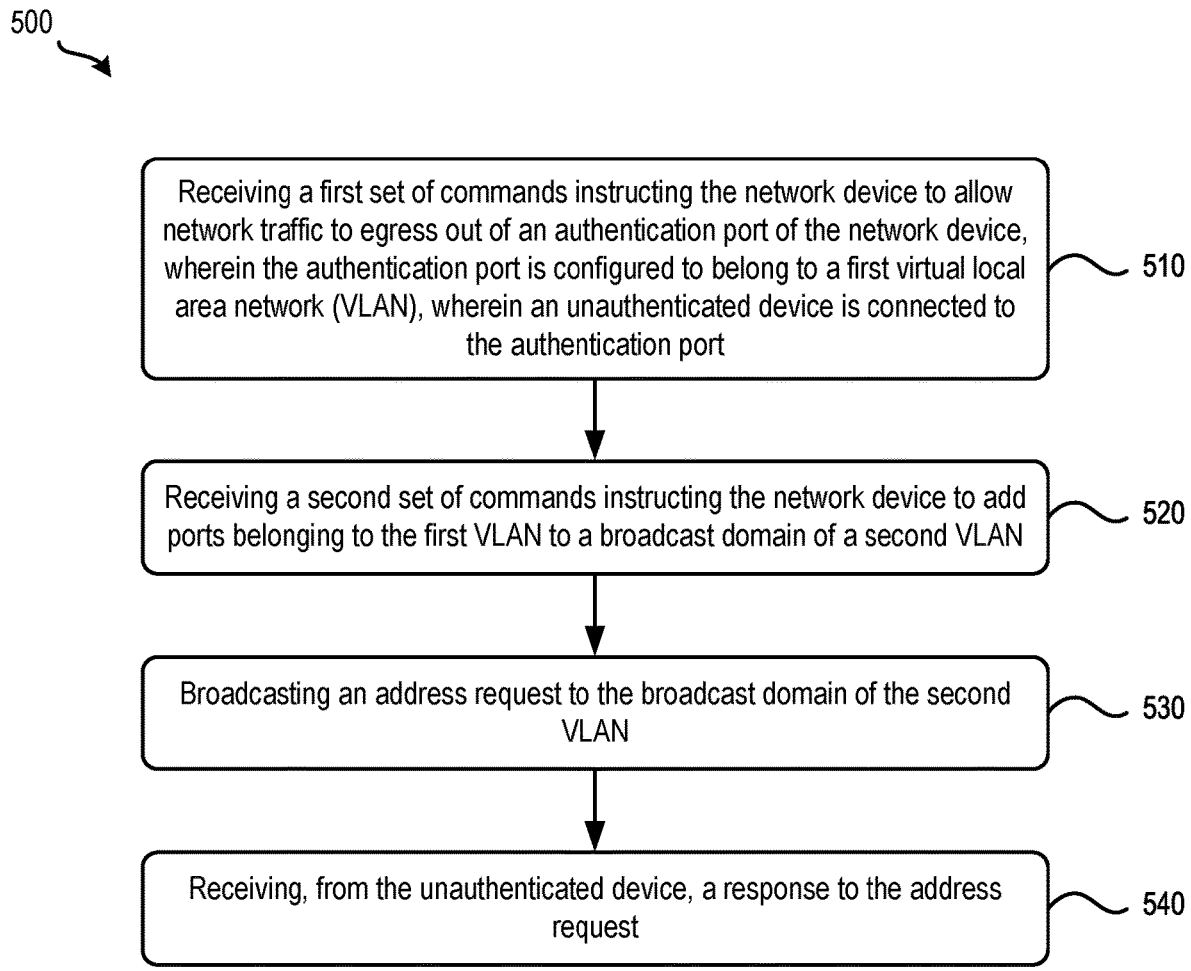
FIG. 5 illustrates a process for authenticating a passive device according to some embodiments.

FIG. 5 illustrates a process 500 for authenticating a passive device according to some embodiments. In some embodiments, network device 145 performs process 500. Process 500 begins by receiving, at 510, a first set of commands instructing the network device to allow network traffic to egress out of an authentication port of the network device. The authentication port is configured to belong to a first virtual local area network (VLAN). An unauthenticated device is connected to the authentication port. Referring to FIG. 2 as an example, network device 145 can receive a set of commands from a user of network device 145 that instructs network device 145 to allow network traffic to egress out of port 156, which is configured as an authentication port and belongs to VLAN 2. Passive device 140 is an unauthenticated device that is connected to port 156.

Next, process 500 receives, at 520, a second set of commands instructing the network device to add ports belonging to the first VLAN to a broadcast domain of a second VLAN. Referring to FIG. 2 as an example, network device 145 may receive a set of commands instructing network device 145 to add ports belonging to the VLAN 2 to a broadcast domain of VLAN 3. Process 500 then broadcasts, at 530, an address request to the broadcast domain of the second VLAN. Referring to FIG. 3 as an example, network device 145 can receive an HTTP request from network host 130 that specifies the IP address of passive device 140 as the destination IP address. In response to receiving the request, forwarding manager 165 determines that ARP table 175 does not have an entry with an IP address that matches the IP address specified in the request (10.1.1.6 in this example). Thus, forwarding manager 165 broadcasts an ARP request specifying the IP address of the request to the broadcast domain of VLAN 3. Since the ports belonging to VLAN 2 are configured to be included in the broadcast domain of VLAN 3, the ARP request is broadcasted to passive device 140. As another example, network device 145 may receive an ARP request from another network device connected to via a port that is configured to belong to VLAN 3. In response to receiving the ARP request, broadcasts the ARP request to the broadcast domain of VLAN 3.

Finally, process 500 receives, at 540, from the unauthenticated device, a response to the address request. Referring to FIG. 3 as an example, passive device 140 sends an ARP response to the ARP request because passive device 140 is configured with the IP address specified in the ARP request. As such, network device 145 receives the ARP response from passive device 140.

4. Further Examples

The following are some example embodiments of the present disclosure. In some embodiments, a method, executable by a network device, receives a first set of commands instructing the network device to allow network traffic to egress out of an authentication port of the network device, wherein the authentication port is configured to belong to a first virtual local area network (VLAN), wherein an unauthenticated device is connected to the authentication port. The method further receives a second set of commands instructing the network device to add ports belonging to the first VLAN to a broadcast domain of a second VLAN. The method also broadcasts an address request to the broadcast domain of the second VLAN. The method further receives, from the unauthenticated device, a response to the address request.

In some embodiments, the response is a first response. The method further sends a computing device a request to authenticate the unauthenticated device and receives from the computing device a second response indicating that the unauthenticated device is now an authenticated device.

In some embodiments, the second response includes an address associated with the authenticated device and a VLAN identifier associated with the second VLAN. In response to receiving the second response, the method further updates a storage of the network device with a mapping between the address of the authenticated device, the authentication port, and the VLAN identifier associated with the second VLAN.

In some embodiments, the method further receives from a client device a second request destined for the authenticated device and forwards the second request to the authenticated device.

In some embodiments, the storage is a first storage. The second request is received at a routed interface of the network device. The address associated with the authenticated device is a first address. The second request includes a second address associated with the authenticated device. Forwarding the second request to the authenticated device includes forwarding the second request from the routed interface to a corresponding VLAN interface associated with the second VLAN; determining that a second storage associated with the VLAN interface includes a mapping between the second address associated with the authenticated device and the first address associated with the authenticated device; determining that the first storage includes the mapping between the address of the authenticated device, the authentication port, and the VLAN identifier associated with the second VLAN; and forwarding the second request to the authenticated device through the authentication port.

In some embodiments, the method receives, from a client device, a request destined for the unauthenticated device and generates the address request.

In some embodiments, in response to receiving the request, the method further determines that a storage of the network device does not include a mapping that includes an address associated with the unauthenticated device. The address request is generated in response to determining that the storage of the network device does not include the mapping comprising the address associated with the unauthenticated device, wherein the address request is broadcasted to the broadcast domain of the second VLAN in response to generating the address request.

In some embodiments, broadcasting the address request to the broadcast domain of the second VLAN causes the address request to be broadcasted to the unauthenticated device.

In some embodiments, the network device is a first network device. The method further comprises receiving, from a second network device, the address request. The address request is broadcasted to the broadcast domain of the second VLAN is performed in response to receiving the address request from the second network device.

In some embodiments, the address request is generated by the second network device.

In some embodiments, a network device includes a processor and a non-transitory machine-readable medium that stores instructions. The instructions cause the processor to receive a first set of commands instructing the network device to allow network traffic to egress out of an authentication port of the network device, wherein the authentication port is configured to belong to a first virtual local area network (VLAN), wherein an unauthenticated device is connected to the authentication port. The instructions further cause the processor to receive a second set of commands instructing the network device to add ports belonging to the first VLAN to a broadcast domain of a second VLAN. The instructions also cause the processor to broadcast an address request to the broadcast domain of the second VLAN. The instructions further cause the processor to receive, from the unauthenticated device, a response to the address request.

In some embodiments, the response is a first response. The instructions further cause the processor to send a computing device a request to authenticate the unauthenticated device and receive from the computing device a second response indicating that the unauthenticated device is now an authenticated device.

In some embodiments, the second response includes an address associated with the authenticated device and a VLAN identifier associated with the second VLAN. In response to receiving the second response, the instructions further cause the processor to update a storage of the network device with a mapping between the address of the authenticated device, the authentication port, and the VLAN identifier associated with the second VLAN.

In some embodiments, the instructions further cause the processor to receive from a second client device a request destined for the authenticated device and forward the second request to the authenticated device.

In some embodiments, the storage is a first storage. The second request is received at a routed interface of the network device. The address associated with the authenticated device is a first address. The second request includes a second address associated with the authenticated device. Forwarding the second request to the authenticated device includes forwarding the second request from the routed interface to a corresponding VLAN interface associated with the second VLAN; determining that a second storage associated with the VLAN interface includes a mapping between the second address associated with the authenticated device and the first address associated with the authenticated device; determining that the first storage includes the mapping between the address of the authenticated device, the authentication port, and the VLAN identifier associated with the second VLAN; and forwarding the second request to the authenticated device through the authentication port.

In some embodiments, a non-transitory machine-readable medium stores a program executable by at least processor of a network device. The program receives a first set of commands instructing the network device to allow network traffic to egress out of an authentication port of the network device, wherein the authentication port is configured to belong to a first virtual local area network (VLAN), wherein an unauthenticated device is connected to the authentication port. The program further receives a second set of commands instructing the network device to add ports belonging to the first VLAN to a broadcast domain of a second VLAN. The program also broadcasts an address request to the broadcast domain of the second VLAN. The program further receives, from the unauthenticated device, a response to the address request.

In some embodiments, the program further receives, from a client device, a request destined for the unauthenticated device and generating the address request.

In some embodiments, the program further, in response to receiving the request, determines that a storage of the network device does not include a mapping comprising an address associated with the unauthenticated device. The address request is generated in response to determining that the storage of the network device does not include the mapping comprising the address associated with the unauthenticated device. The address request is broadcasted to the broadcast domain of the second VLAN in response to generating the address request.

In some embodiments, broadcasting the address request to the broadcast domain of the second VLAN causes the address request to be broadcasted to the unauthenticated device.

In some embodiments, the network device is a first network device. The program further receives, from a second network device, the address request, wherein the address request is broadcasted to the broadcast domain of the second VLAN is performed in response to receiving the address request from the second network device.

5. Example Network Device

Figure 6:
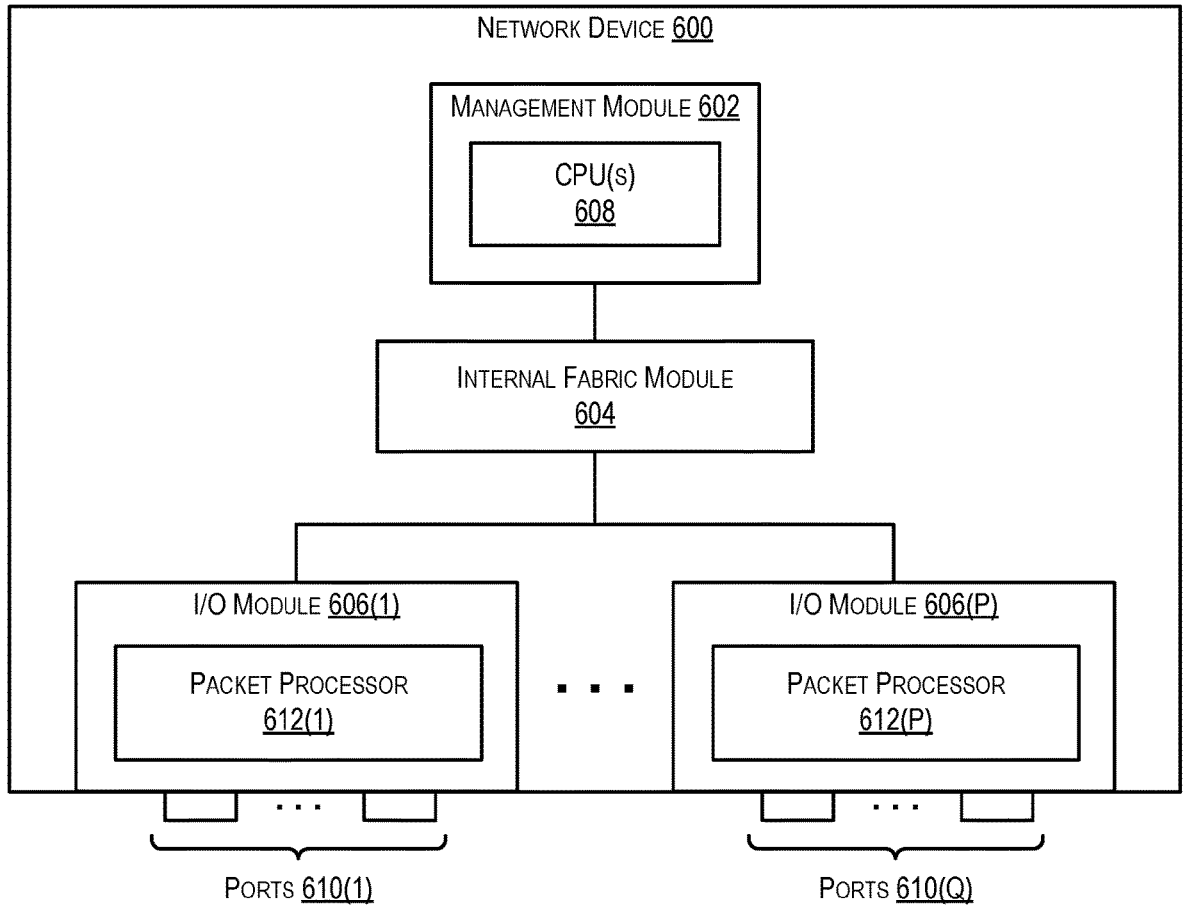
FIG. 6 illustrates an example network device according to certain embodiments.

FIG. 6 depicts an example network device (e.g., a network switch and/or router) 600 that may be used to implement a hardware-based version of network device 145 of FIG. 1 in certain embodiments—in other words, a version of network device 145 that is implemented, at least in part, via one or more ASICs and/or other hardware processing elements.

As shown, network device 600 includes a management module 602, an internal fabric module 604, and a number of I/O modules 606(1)-606(P). Management module 602 includes one or more management CPUs 608 for managing/controlling the operation of the device. Each management CPU 608 can be a general purpose processor, such as an Intel/AMD x86 or ARM-based processor, that operates under the control of software stored in an associated memory (not shown).

Internal fabric module 604 and I/O modules 606(1)-606(P) collectively represent the data, or forwarding, plane of network device 600. Internal fabric module 604 is configured to interconnect the various other modules of network device 600. Each I/O module 606(1)-606(P) includes one or more input/output ports 610(1)-610(Q) that are used by network device 600 to send and receive network packets. Each I/O module 606(1)-606(P) can also include a packet processor 612(1)-612(P). Packet processor 612(1)-612(P) is a hardware processing component (e.g., an ASIC) that can make wire speed decisions on how to handle incoming or outgoing network packets. In certain embodiments, one or more of the techniques described in the present disclosure may be implemented wholly, or in part, within packet processors 612(1)-612(P).

It should be appreciated that network device 600 is illustrative and many other configurations having more or fewer components than network device 600 are possible.

6. Example Computer System

Figure 7:
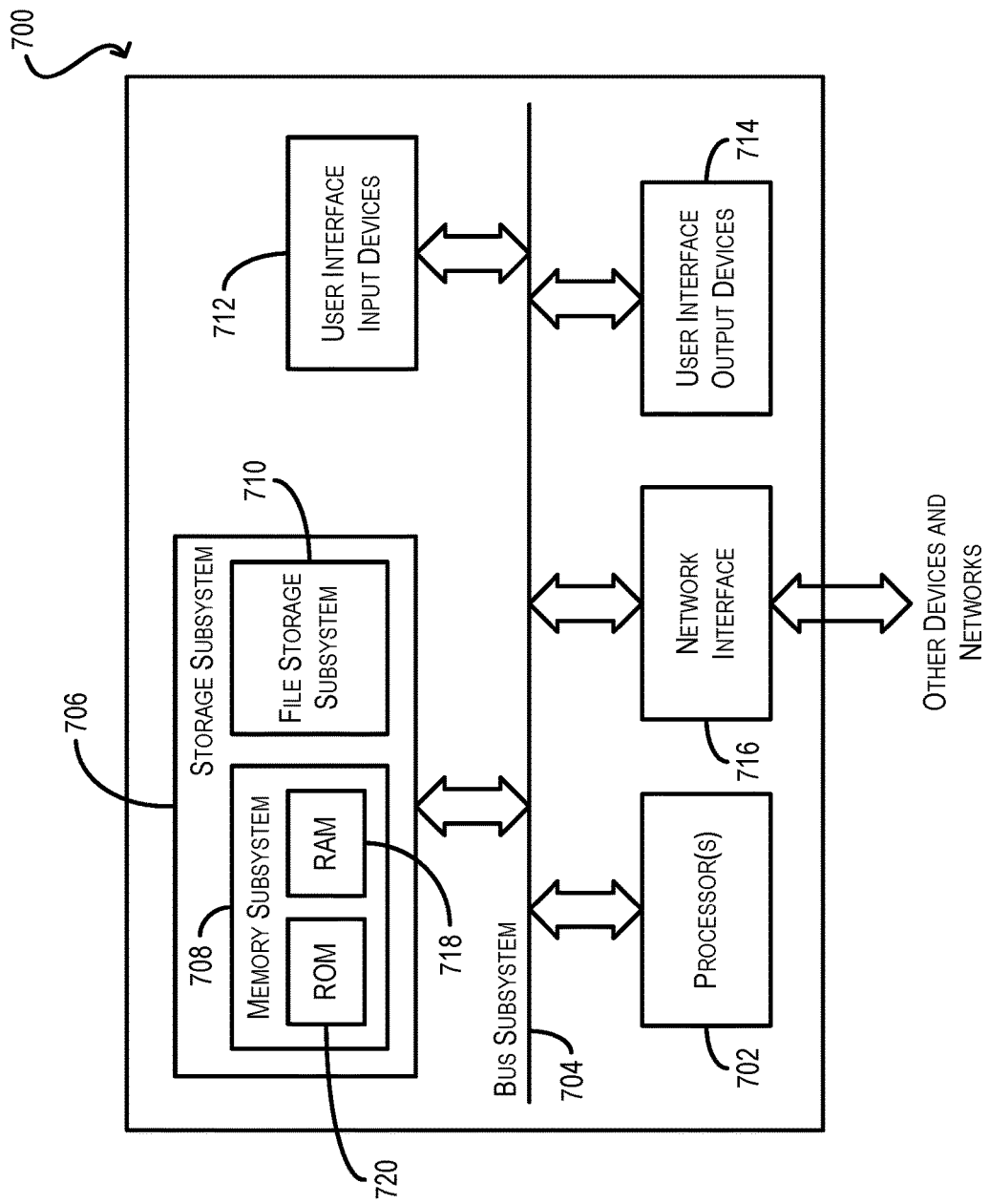
FIG. 7 illustrates an example computer system according to some embodiments.

FIG. 7 depicts an example computer system 700 according to some embodiments. Computer system 700 can be used to implement any of the computing devices, systems, servers, network elements, etc., described in the foregoing disclosure (e.g., network hosts 105-130, authentication device 135, passive device 140, network device 145, etc.). As shown in FIG. 7, computer system 700 includes one or more processors 702 that communicate with a number of peripheral devices via a bus subsystem 704. These peripheral devices include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple buses.

Network interface subsystem 716 can serve as an interface for communicating data between computer system 700 and other computer systems or networks. Embodiments of network interface subsystem 716 can include, e.g., an Ethernet card, a Wi-Fi and/or cellular adapter, a modem (telephone, satellite, cable, ISDN, etc.), digital subscriber line (DSL) units, and/or the like.

User interface input devices 712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 700.

User interface output devices 714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 700.

Storage subsystem 706 includes a memory subsystem 708 and a file/disk storage subsystem 710. Subsystems 708 and 710 represent non-transitory machine-readable storage media that can store program code and/or data that provide the functionality of embodiments of the present disclosure.

Memory subsystem 708 includes a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

Some embodiments may be implemented in a non-transitory machine-readable storage medium for use by or in connection with the instruction execution system, apparatus, system, or machine. The machine-readable storage medium contains instructions for controlling a computer system to perform a method described by some embodiments. The computer system may include one or more computing devices. The instructions, when executed by one or more computer processors, may be configured to perform that which is described in some embodiments.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method for authenticating an unauthenticated passive device to receive network traffic, executable by a first network device, comprising:
   receiving a first set of commands instructing the first network device to allow network traffic to egress out of an authentication port of the first network device, wherein the authentication port is configured to belong to a first virtual local area network (VLAN), wherein the unauthenticated passive device is connected to the authentication port;
   receiving a second set of commands instructing the first network device to add at least one port belonging to the first VLAN to a broadcast domain of a second VLAN;
   receiving, from a client device, a request destined for the unauthenticated passive device;
   generating the address request;
   in response to receiving the request, determining that a first storage of the first network device does not include a mapping comprising an address associated with the unauthenticated passive device,
   wherein the address request is generated in response to determining that the first storage of the first network device does not include the mapping comprising the address associated with the unauthenticated passive device;
   broadcasting an address request to a plurality of ports within the broadcast domain of the second VLAN;
   wherein the address request is broadcasted to the plurality of ports within the broadcast domain of the second VLAN in response to generating the address request; and
   receiving, from the unauthenticated passive device, a response to the address request to configure the authentication port to allow ingress and egress traffic to the second VLAN.

2. The method of claim 1, wherein the response is a first response, the method further comprising:
   sending a computing device a request to authenticate the unauthenticated passive device; and
   receiving from the computing device a second response indicating that the unauthenticated passive device is now an authenticated passive device.

3. The method of claim 2, wherein the second response comprises aft a first address associated with the authenticated passive device and a VLAN identifier associated with the second VLAN,
the method further comprising, in response to receiving the second response, updating a first storage of the first network device with a mapping between the first address of the authenticated passive device, the authentication port, and the VLAN identifier associated with the second VLAN.

4. The method of claim 3, further comprising:
receiving from a client device a second request destined for the authenticated passive device; and
forwarding the second request to the authenticated passive device.

5. The method of claim 4, wherein the second request is received at a routed interface of the first network device,
wherein the second request comprises a second address associated with the authenticated passive device, wherein forwarding the second request to the authenticated passive device comprises:
forwarding the second request from the routed interface to a corresponding VLAN interface associated with the second VLAN;
determining that a second storage associated with the VLAN interface includes a mapping between the second address associated with the authenticated passive device and the first address associated with the authenticated passive device;
determining that the first storage includes the mapping between the first address of the authenticated passive device, the authentication port, and the VLAN identifier associated with the second VLAN; and
forwarding the second request to the authenticated passive device through the authentication port.

6. The method of claim 1, wherein broadcasting the address request to the broadcast domain of the second VLAN causes the address request to be broadcasted to the unauthenticated passive device.

7. The method of claim 1, wherein the method further comprises:
receiving, from a second network device, the address request,
wherein broadcasting the address request to the plurality of ports within the broadcast domain of the second VLAN is performed in response to receiving the address request from the second network device.

8. The method of claim 1, wherein the address request is generated by a second network device.

9. A first network device comprising:
at least one processor; and
a non-transitory machine-readable medium storing instructions for authenticating an unauthenticated passive device to receive network traffic that when executed by the at least one processor cause the at least one processor to:
receive a first set of commands instructing the first network device to allow network traffic to egress out of an authentication port of the first network device, wherein the authentication port is configured to belong to a first virtual local area network (VLAN), wherein an unauthenticated passive device is connected to the authentication port;
receive a second set of commands instructing the first network device to add at least one port belonging to the first VLAN to a broadcast domain of a second VLAN;
receive, from a client device, a request destined for the unauthenticated passive device:
generate the address request;
in response to receiving the request, determine that a first storage of the first network device does not include a mapping comprising an address associated with the unauthenticated passive device,
wherein the address request is generated in response to determining that the first storage of the first network device does not include the mapping comprising the address associated with the unauthenticated passive device,
broadcast an address request to a plurality of ports within the broadcast domain of the second VLAN;
wherein the address request is broadcasted to the plurality of ports within the broadcast domain of the second VLAN in response to generating the address request; and
receive, from the unauthenticated passive device, a response to the address request to configure the authentication port to allow ingress and egress traffic to the second VLAN.

10. The first network device of claim 9, wherein the response is a first response, wherein the instructions further cause the at least one processor to:
send a computing device a request to authenticate the unauthenticated passive device; and
receive from the computing device a second response indicating that the unauthenticated passive device is now an authenticated passive device.

11. The first network device of claim 10, wherein the second response comprises a first address associated with the authenticated passive device and a VLAN identifier associated with the second VLAN,
wherein the instructions further cause the at least one processor to, in response to receiving the second response, update a first storage of the first network device with a mapping between the first address of the authenticated passive device, the authentication port, and the VLAN identifier associated with the second VLAN.

12. The first network device of claim 11, wherein the instructions further cause the at least one processor to:
receive from a client device a second request destined for the authenticated passive device; and
forward the second request to the passive authenticated device.

13. The first network device of claim 12, wherein the second request is received at a routed interface of the first network device, wherein the second request comprises a second address associated with the authenticated passive device, wherein forwarding the second request to the authenticated passive device comprises:
forwarding the second request from the routed interface to a corresponding VLAN interface associated with the second VLAN;
determining that a second storage associated with the VLAN interface includes a mapping between the second address associated with the authenticated passive device and the first address associated with the authenticated passive device;
determining that the first storage includes the mapping between the first address of the authenticated passive device, the authentication port, and the VLAN identifier associated with the second VLAN; and
forwarding the second request to the authenticated passive device through the authentication port.

14. A non-transitory machine-readable medium storing a program executable by at least one processor of a first network device, the program comprising sets of instructions for authenticating an unauthenticated passive device to receive network traffic by:
  receiving a first set of commands instructing the first network device to allow network traffic to egress out of an authentication port of the first network device, wherein the authentication port is configured to belong to a first virtual local area network (VLAN), wherein an unauthenticated passive device is connected to the authentication port;
  receiving a second set of commands instructing the first network device to add at least one port belonging to the first VLAN to a broadcast domain of a second VLAN;
  receiving, from a client device, a request destined for the unauthenticated passive device; and
  generating the address request;
  in response to receiving the request, determining that a first storage of the first network device does not include a mapping comprising a first address associated with the unauthenticated passive device,
  wherein the address request is generated in response to determining that the first storage of the first network device does not include the mapping comprising the first address associated with the unauthenticated passive device;
  broadcasting an address request to a plurality of ports within the broadcast domain of the second VLAN;
  wherein the address request is broadcasted to the plurality of ports within the broadcast domain of the second VLAN in response to generating the address request; and
  receiving, from the unauthenticated passive device, a response to the address request to configure the authentication port to allow ingress and egress traffic to the second VLAN.

15. The non-transitory machine-readable medium of claim 14, wherein broadcasting the address request to the plurality of ports within the broadcast domain of the second VLAN causes the address request to be broadcasted to the unauthenticated passive device.

16. The non-transitory machine-readable medium of claim 14, wherein the program further comprises a set of instructions for receiving, from a second network device, the address request, wherein broadcasting the address request to the plurality of ports within the broadcast domain of the second VLAN is performed in response to receiving the address request from the second network device.

* * * * *